United States Patent
Logie (10) Patent No.: US 11,721,097 B2
(45) Date of Patent: Aug. 8, 2023

(54) FIELD IMAGE CORRELATION DIFFERENTIAL CHANGE DETECTION AND ALERTING SYSTEM

(71) Applicant: FARMERS EDGE INC., Winnipeg (CA)

(72) Inventor: Gordon Logie, Winnipeg (CA)

(73) Assignee: Farmers Edge Inc., Winnipeg (CA)

(*) Notice: Subject to any disclaimer, the term of this patent is extended or adjusted under 35 U.S.C. 154(b) by 211 days.

(21) Appl. No.: 17/373,891

(22) Filed: Jul. 13, 2021

(65) Prior Publication Data

US 2022/0019794 A1    Jan. 20, 2022

Related U.S. Application Data (60) Provisional application No. 63/051,623, filed on Jul. 14, 2020.

(51) Int. Cl.
*G06V 10/75* (2022.01)
*G06V 20/10* (2022.01)

(52) U.S. Cl.
CPC ............ *G06V 20/188* (2022.01); *G06V 10/75* (2022.01); *G06V 10/751* (2022.01)

(58) Field of Classification Search
CPC ..... G06V 20/188; G06V 10/75; G06V 10/751
See application file for complete search history.

(56) References Cited

U.S. PATENT DOCUMENTS

| | | | | |
|---|---|---|---|---|
| 9,638,678 | B2* | 5/2017 | Shriver | G06F 18/22 |
| 2014/0035752 | A1* | 2/2014 | Johnson | A01B 79/005 |
| | | | | 340/601 |
| 2016/0283791 | A1* | 9/2016 | Ogura | G06Q 50/02 |
| 2017/0358106 | A1* | 12/2017 | Yoshimura | G01J 3/51 |
| 2019/0259108 | A1* | 8/2019 | Bongartz | G06Q 10/0639 |

FOREIGN PATENT DOCUMENTS

| | | |
|---|---|---|
| CN | 105046242 | 11/2015 |
| CN | 109146948 | 1/2019 |
| JP | 2013145507 | 7/2013 |

* cited by examiner

*Primary Examiner* — Shaghayegh Azima
(74) *Attorney, Agent, or Firm* — Ryan W. Dupuis; Kyle R. Satterthwaite; Ade & Company Inc.

(57) ABSTRACT

A system and method detect a change within an agricultural field during a growing season. The system and method involve the computation of correlation coefficients between pairs of images in a time series of images over an area, for example an agricultural field. Through comparisons of correlation coefficients over time, sudden field changes can be detected. When these field changes meet specified criteria (such as a minimum value threshold), a notification (alert) can be sent to an agricultural grower, informing them of the change in crop condition, and allowing them to view the changes in the field.

15 Claims, 6 Drawing Sheets

FIELD IMAGE CORRELATION DIFFERENTIAL CHANGE DETECTION AND ALERTING SYSTEM

This application claims the benefit under 35 U.S.C. 119(e) of U.S. provisional application Ser. No. 63/051,623, filed Jul. 14, 2020.

FIELD OF THE INVENTION

This description relates to the detection of changes within an agricultural field. More specifically, this description relates to the use of remotely-sensed image data for automatically detecting when field changes have occurred based on cross-correlation of image spectral data.

BACKGROUND

Remotely-sensed image data and products derived from that data (i.e., imagery products) are being increasingly utilized in agriculture. This is because these data products can provide rapid, synoptic estimates of crop conditions over a large number of agricultural acres.

Despite the utility offered by these imagery products, manual inspection of images can be very time consuming and tedious. This can be particularly true for growers operating very large farming operations. Manual inspection of images and imagery products can also require expertise and experience to properly interpret the data. As such, a method to automatically detect field changes is desirable, particularly if such a change represents a potential problem with the crops within the field.

SUMMARY OF THE INVENTION

According to one aspect of the invention there is provided a method of detecting a change within an agricultural field during a growing season, the method comprising:
 (a) receiving a plurality of remotely sensed images of the agricultural field acquired during the growing season;
 (b) for each one of a plurality of the remotely sensed images, using a processor,
   (i) designating a currently selected one of the remotely sensed images as a master image;
   (ii) identifying a set of past images among the remotely sensed images that were acquired before the master image;
   (iii) computing a past correlation coefficient between each past image and the master image;
   (iv) identifying a maximum past correlation value among the past correlation coefficients;
   (v) identifying a set of future images among the remotely sensed images that were acquired after the master image;
   (vi) computing a future correlation coefficient between each future image and the master image;
   (vii) identifying a maximum future correlation value among the future correlation coefficients; and
   (viii) computing a correlation differential value corresponding to a difference between the maximum past correlation value and the maximum future correlation value; and
 (c) comparing each correlation differential value to a notification criterium and determining a notification condition if one of the correlation differential values meets the notification criterium.

According to a second aspect of the present invention there is provided a system for detecting a change within an agricultural field during a growing season, the system comprising:
 a memory storing programming instructions thereon;
 at least one processor operably coupled to the memory so as to execute the programming instructions whereby said at least one processor is configured to:
   (a) receive a plurality of remotely sensed images of the agricultural field acquired during the growing season;
   (b) for each one of a plurality of the remotely sensed images:
     (i) identify a currently selected one of the remotely sensed images as a master image;
     (ii) identify a set of past images among the remotely sensed images that were acquired before the master image;
     (iii) compute a past correlation coefficient between each past image and the master image;
     (iv) identify a maximum past correlation value among the past correlation coefficients;
     (v) identify a set of future images among the remotely sensed images that were acquired after the master image;
     (vi) compute a future correlation coefficient between each future image and the master image;
     (vii) identify a maximum future correlation value among the future correlation coefficients; and
     (viii) compute a correlation differential value corresponding to a difference between the maximum past correlation value and the maximum future correlation value; and
   (c) compare each correlation differential value to a notification criterium and determine a notification condition if one of the correlation differential values meets the notification criterium.

This disclosure describes various methods and systems used for the detection of change within an agricultural field using remotely-sensed image data. The described method involves the computation of correlation coefficients between pairs of images in a time series of images over an area, for example an agricultural field. Through comparisons of correlation coefficients over time, sudden field changes can be detected. When these field changes meet specified criteria (such as a minimum value threshold), a notification (alert) can be sent to an agricultural grower, informing them of the change in crop condition, and allowing them to view the changes in the field.

The method may further include only identifying the maximum past correlation value for the master images that have a number of past images that exceeds a prescribed lower limit associated with the maximum past correlation value, and only identifying the maximum future correlation value for the master images that have a number of future images that exceed a prescribed lower limit associated with the maximum future correlation value.

The method may further include identifying only remotely sensed images acquired within a prescribed range of time preceding acquisition of the master image as the past images within the set of past images.

The method may further include identifying only remotely sensed images acquired within a prescribed range of time following acquisition of the master image as the future images within the set of future images.

The method may further include computing each past correlation coefficient and each future correlation coefficient as a measure of linear correlation between pixel values for spatially co-registered pixels between the images.

The method may further be arranged such that the step of computing the past correlation coefficient and the future correlation coefficient for each master image further includes calculating a correlation value between pixel values for each one of a plurality of matching spectral bands of the images.

The method may further be arranged such that the step of computing the past correlation coefficient and the future correlation coefficient for each master image further includes calculating a correlation value between pixel values for near-infrared bands of the images.

The method may further be arranged such that the step of computing the past correlation coefficient and the future correlation coefficient for each master image further includes calculating a correlation value between vegetation indexes of the images.

The method may further include identifying the maximum past correlation value as a largest absolute value among the past correlation coefficients and identifying the maximum future correlation value as a largest absolute value among the future correlation coefficients.

The method may further comprise: (i) for each past image computing the past correlation coefficient as an average correlation value of a plurality of different correlation values representing correlations between different matchings spectral bands between the images and identifying the maximum past correlation value as a largest absolute value among the average correlation values; and (ii) for each future image computing the future correlation coefficient as an average correlation value of a plurality of different correlation values representing correlations between different matchings spectral bands between the images and identifying the maximum future correlation value as a largest absolute value among the average correlation values.

The method may further include comparing any positive correlation differential values to a prescribed positive notification criterium and comparing any negative correlation differential values to a prescribed negative notification criterium.

The method may further include comparing each correlation differential value to a plurality of different notification criteria having different notification conditions associated therewith and determining the notification condition based upon which notification criterium has been met.

The method may further include generating a notification arranged to be transmitted over a network to a computing device configured to receive the notification in response to determination of the notification condition, the notification including the master image associated with the correlation differential value that met the notification criterium.

The method may further comprise determining a range of image acquisition dates when a field change has occurred by (i) identifying an acquisition date of the master image associated with the correlation differential value that met the notification criterium, (ii) identifying if the field change occurred before or after the acquisition date of the master image based on the correlation differential value being positive or negative, (iii) determining a prescribed range of dates of the set of past images or the set of future images depending upon identification of the field change occurring before or after the acquisition date.

In each instance above, the method may further include generating a notification arranged to be transmitted over a network to a computing device configured to receive the notification in response to determination of the notification condition. In one exemplary embodiment, the notification may include the range of image acquisition dates when the field change has occurred.

BRIEF DESCRIPTION OF THE DRAWINGS

The disclosed embodiments have other advantages and features which will be more readily apparent from the detailed description and the accompanying figures (or drawings). A brief introduction of the figures is below.

In the drawings like characters of reference indicate corresponding parts in the different figures.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable similar or like reference numbers may be used in the figures and may indicate similar or like functionality. The figures depict embodiments of the disclosed system (or method) for purposes of illustration only.

Overview

With an ever-growing number of available imaging platforms, it is increasingly possible for agricultural growers to get very high-frequency imagery of their fields. Commercial satellite platforms are now capable of offering sub-daily revisit frequencies, and the proliferation of commercial-grade unmanned aerial platforms allows growers to obtain their own imagery. However, this higher image frequency also means it can be impractical for growers to manually sort through and analyze all the available data obtained from across their farms and fields. Additionally, greater redundancy between images of a field can occur due to the higher revisit frequencies of imaging platforms, stemming from the fact that crop conditions generally remaining stable over short time intervals (e.g., between subsequent revisits). Generally, a change in crop conditions between two instances in time (e.g., two images) will be of interest to the grower, while the crop condition remaining unchanged will not be.

To maximize the utility of high-frequency image data, a system for automatically detecting changes within a field using imagery and imagery-derived products is desirable. In a particular example, once a change is detected, a notification may automatically be sent to the growers (or another third-party entity). A detailed description of the processes and algorithms utilized in this system follows below, including specific example implementations.

System Environment

Figure 1:
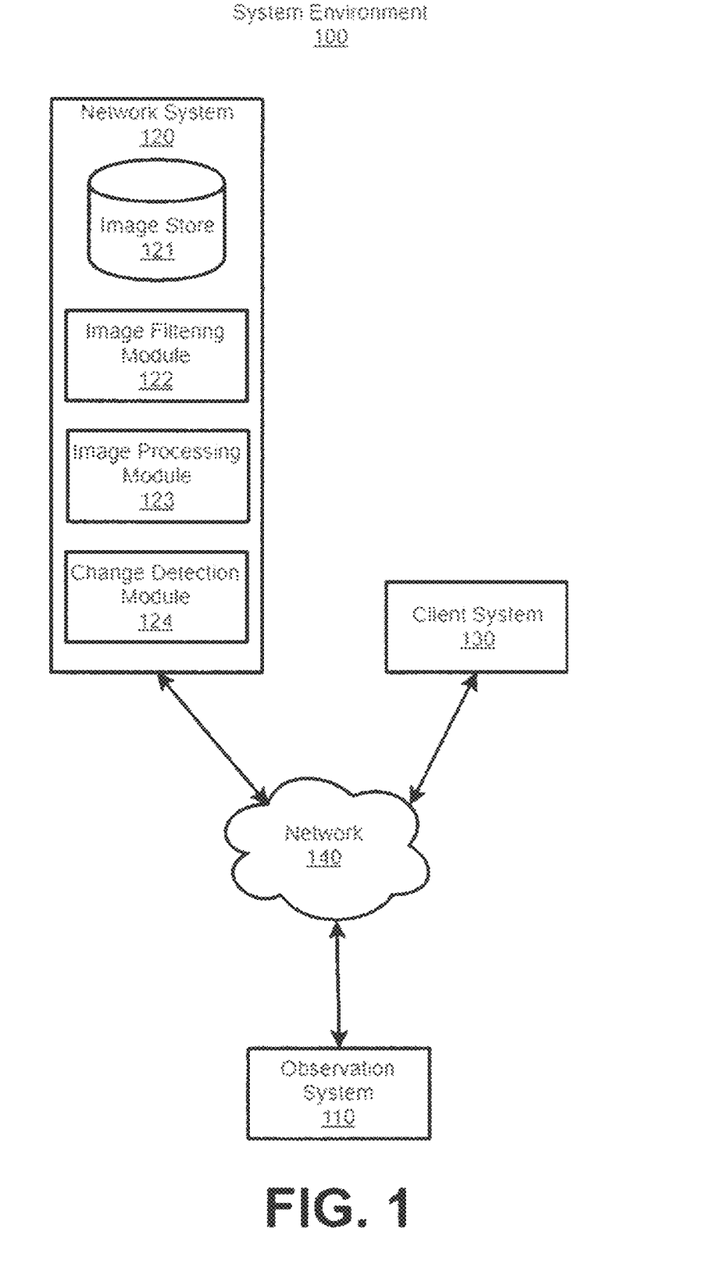
FIG. 1 illustrates a system environment for detection of change over an agricultural field using remotely sensed image products, according to one example embodiment.

FIG. 1 illustrates a system environment for detection of crop health change over an agricultural field using remotely sensed image products, according to one example embodiment. Within the system environment 100 is an observation system 110, network system 120, client system 130, and a network 140 which links the different systems together. The network system 120 includes an image store 121, image filtering module 122, image processing module 123, and change detection module 124.

Other examples of a system environment are possible. For example, in various embodiments, the system environment 100 may include additional or fewer systems. To illustrate, a single client system may be responsible for multiple agricultural fields. The network system may leverage observations from multiple observation systems 110 to detect crop change for each of the agricultural fields. Furthermore, the capabilities attributed to one system within the environment may be distributed to one or more other systems within the system environment 100. For example, the change detection module 124 may be executed on the client system 130 rather than the network system 120.

An observation system 110 is a system which provides remotely-sensed data of an agricultural field. In an embodiment, the remotely-sensed data is an observed image. Herein, an observed image is an image or photograph of an agricultural field taken from a remote sensing platform (e.g. an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop conditions within an agricultural field in the image.

The observation system 110 may provide images of an agricultural field over a network 140 to the network system 120, wherein said images may be stored in the image store 121. Additionally or alternatively, imagery derivatives generated by the image filtering module 122, image processing module 123, or change detection module 124 may also be stored in the image store 121.

The image filtering module 122 inputs an observed image and outputs a filtered image. The observed image may be accessed from the image store 121 or directly received from the observation system 110. A filtered image is the observed image that has been filtered such that it can be processed by the image processing module 123 and utilized for field change detection in the change detection module 124.

The image processing module 123 takes filtered images provided by the image filtering module 122 and processes them through to derivative products needed by the change detection module 124.

The change detection module 124 uses the image derivatives provided by the image processing module 123 to detect changes within an agricultural field. If certain criteria are met, the change detection module will generate a notification to be transmitted to the client system 110 via a network 140.

Image Filtering

Filtering of images provided by the observation system 110 or retrieved from the image store 121 is performed using the image filtering module 122. Image filtering is performed to ensure images are suitable for use in the change detection process.

There are numerous reasons why an image may be unsuitable for change detection. Pixel values in an observed image obtained from a remote sensing platform are a measurement of electromagnetic radiation (EMR) originating from the sun (a quantity hereafter referred to as radiance), passing through the atmosphere, being reflected from objects on the Earth's surface (i.e. an agricultural field), then passing through part or all of the atmosphere once again before being received by a remote sensor (a quantity hereafter referred to as radiance). The proportion of radiance received by ground objects relative to the irradiance received by these objects (a measure hereafter referred to as surface reflectance) is of primary interest to remote sensing applications, as this quantity may provide information on the characteristics of these objects. However, atmospheric effects can introduce detrimental impacts on the measured EMR signal in an observed image which can render some or all of the image pixels inconsistent, inaccurate, and, generally, untenable for use in accurate detection of crop condition changes.

Atmospheric scattering and absorption is one major source of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including: some EMR from the sun not making it to objects on the ground; some EMR from the sun scattering back into the remote sensor before reaching the ground; some EMR reflected from the ground not reaching the remote sensor. While the EMR output from the sun is well understood and relatively invariant, atmospheric scattering and absorption can vary markedly both over time and space, depends on the type and amount of atmospheric molecules, and also depends on the path length of the EMR transmission through the atmosphere.

One adjustment for atmospheric effects is a correction of raw image data to top-of-atmosphere (TOA) reflectance units, a quantity hereafter referred to TOA reflectance. This correction converts the radiance measured by the sensor to TOA reflectance units expressed as the ratio between the radiance being received at the sensor and the irradiance from the sun, with a correction applied based on the path of the EMR both from the sun to the target as well as from the target to the remote sensor. This first order correction can mitigate for some broad temporal and spatial attenuation of EMR transmission from the atmosphere, but does not account for the variable absorption and scattering which can occur from variations in the atmospheric constituent particles.

A second order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not further discussed here. The end result from atmospheric correction is an estimate of surface reflectance. To mitigate the impact of atmospheric scattering and absorption, in some embodiments the image filtering module 122 may employ either TOA or atmospheric correction techniques.

Another source of uncertainty which may impact observed image quality is the presence of atmospheric clouds or haze, and shadows cast from clouds, which can occlude ground objects and/or attenuate the radiance reflected from these objects. As such, the image filtering module 122 may utilize a cloud and/or shadow masking technique to detect pixels afflicted by these effects. Many techniques exist within the discipline for cloud and shadow masking and are also well known to a person skilled in the art.

The image filtering module 122 may also remove pixels from an observed image (e.g., using cropping, selective deletion, etc.). For example, an observed image may include obstacles or structures (e.g., farm houses, roads, farm equipment) that may be detrimental to assessment of the condition of crops within the field. The image filtering module 122 removes the impacted pixels by, for example, cropping out pixels from the observed image. Pixels impacted by clouds, shadows, and/or haze as detected by a cloud and shadow detection algorithm can also be removed in a similar fashion. The resulting image as an image that provides more accurate data for detection of change in the condition of the crops within the field.

In some cases, the number of deleterious pixels in an image may exceed some critical threshold, thereby preventing the image from being useful in change detection. Similarly, some images may lack full coverage of an agricultural field of interest. In such cases, the image filtering module 122 may remove an image from any further processing and prevent its use in change detection.

Images that have been processed through the image filtering module 122 are hereafter referred to as filtered images.

Image Processing

Filtered images are passed from the image filtering module 122 to the image processing module 123. The image processing module processes the filtered images into derivatives needed by the change detection module 124.

The image processing module 123 extracts the individual spectral bands from the multispectral images passed to it from the image filtering module 122, wherein a spectral band represents reflectance data measured over a specific wavelength range of EMR In an embodiment, this may include the red, green, blue, and near-infrared spectral bands from a standard 4-band multispectral image. Other embodiments may include more or less spectral bands, depending on the input data.

The image processing module 123 also computes vegetation indices (VIs) from input filtered images. Vegetation indices are derivatives created through mathematical operations performed on the extracted image spectral bands. The result from a VI calculation is a new image where each pixel value corresponds with the VI value calculated from the original band values for that pixel in the original image. Vegetation indices have long been used for remote sensing of vegetation since they often demonstrate high correlations with vegetation properties of interest, such as biomass, photosynthetic activity, crop yield, etc. As an example, the image processing module 123 may compute the Normalized Difference Vegetation Index (NDVI). The NDVI is calculated as:

$$NDVI = \frac{NIR - Red}{NIR + Red} \quad (1)$$

where NIR is the image reflectance in the near infrared (NIR) band, and Red is the image reflectance in the Red band. The NDVI is expressed as a decimal value between $-1$ and 1. NDVI values in the range of 0.2 to 0.8 or higher are typically considered an indication of active vegetation, with higher values being correlated with higher biomass, photosynthetic activity, etc. While the NDVI has been used in this example embodiment, other embodiments may utilize any other vegetation index or combination of indices.

Change Detection

The change detection module 124 is used to detect when a field experiences change using the imagery products derived from the image processing module 123. The change detection module 124 is based on cross-correlation of multi-temporal images.

Figure 2:
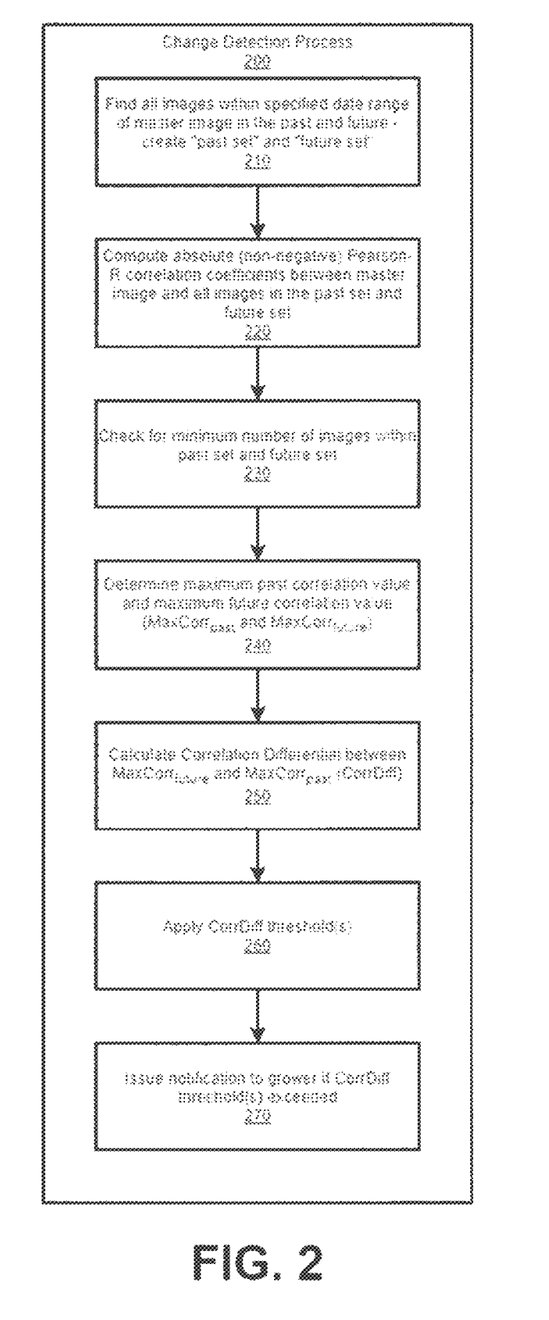
FIG. 2 illustrates the process for detecting change in an agricultural field, according to one example embodiment.

FIG. 2 breaks down the change detection process. The change detection process 200 is executed sequentially on one image at a time across all filtered images of an agricultural field. In an embodiment, each image is considered in chronological order; however, images can be processed in any desired sequence. The filtered image being considered by the algorithm for change is hereafter referred to as the "master image".

In step 210, all filtered images occurring temporally prior to the master image within a specified date range are determined and grouped. This group of images are hereafter referred to as the "past set". The Date Range parameter will be a specified number of days prior to the master image. In an embodiment, the Date Range parameter is set to 15 days in the past.

In addition to compiling the past set all images within a specified number of days into the future beyond the master image are collected into the "future set". The date range parameter for the future set can be set to the same value as used for the past set (i.e. 15 days), or to a differing value. It is important to note that the change detection module 124 requires images in both the past set and future set in order to function. In the case where the change detection process is run in near "real-time", as in during the growing season, the future set requirement means that there will be a time-lag incurred on the change detection process.

Having compiled the past-set and future sets of filtered images, the master image products (i.e. individual spectral bands and NDVI) are tested for correlation against every image in the past set and future set (step 220). This is performed using the Pearson correlation coefficient. The Pearson correlation coefficient is a measure of the linear correlation between two datasets; in the case of two images, the two datasets are the pixel values for the spatially co-registered pixels between a pair of images. The Pearson correlation coefficient values can range between $-1.0$ and 1.0. A value of 1.0 indicates the two image have a perfect linear positive correlation. A value of $-1.0$ indicates the two image have a perfect linear negative correlation. A value of 0.0 indicates no correlation exists between the images. Any values in between indicate imperfect correlation between the images, where values closer to −1.0 or 1.0 imply higher correlations than values closer to 0.0.

Figure 3:
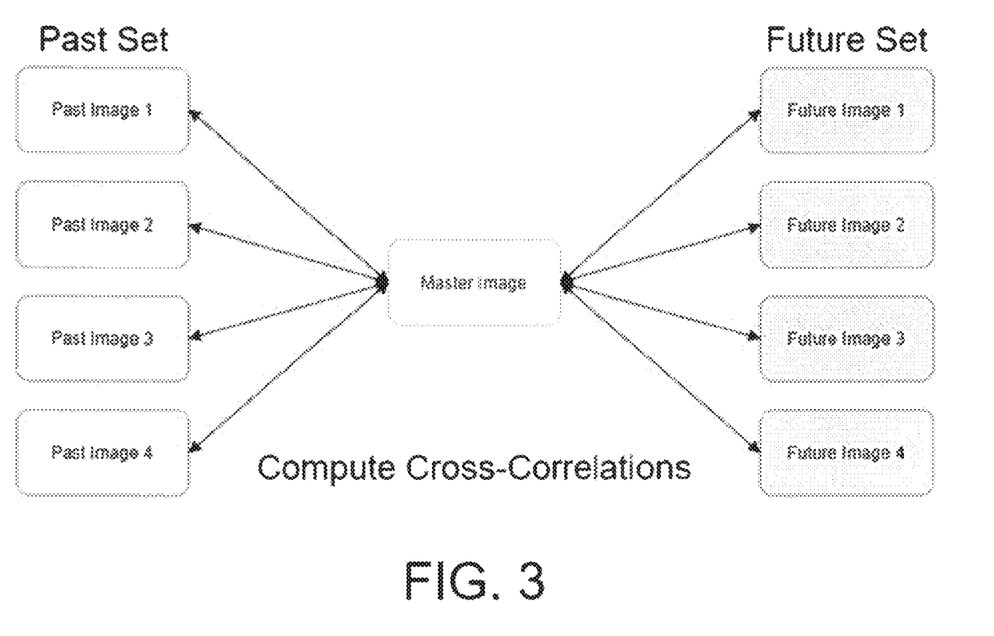
FIG. 3 illustrates the concept of a correlation differential as a means to detect changes occurring within remotely-sensed image data.

Correlations are computed between the matching spectral bands or vegetation index data for each image separately. For example, the blue band for the master image is cross-correlated with the blue band for Image 1 in the past set, along with the green, red, near-infrared, and NDVI bands between the pair of images. Correlations are calculated as the absolute (non-negative) value of the Pearson correlation coefficient. Correlation values between the master image and the images in the past set are stored separately from the correlation values between the master image and the images in the future set. These correlation values are hereafter referred to as the "past correlation set" and "future correlation set", respectively. FIG. 3 illustrates the cross-correlation between the master image and all images in the past set and future set.

Figure 4:
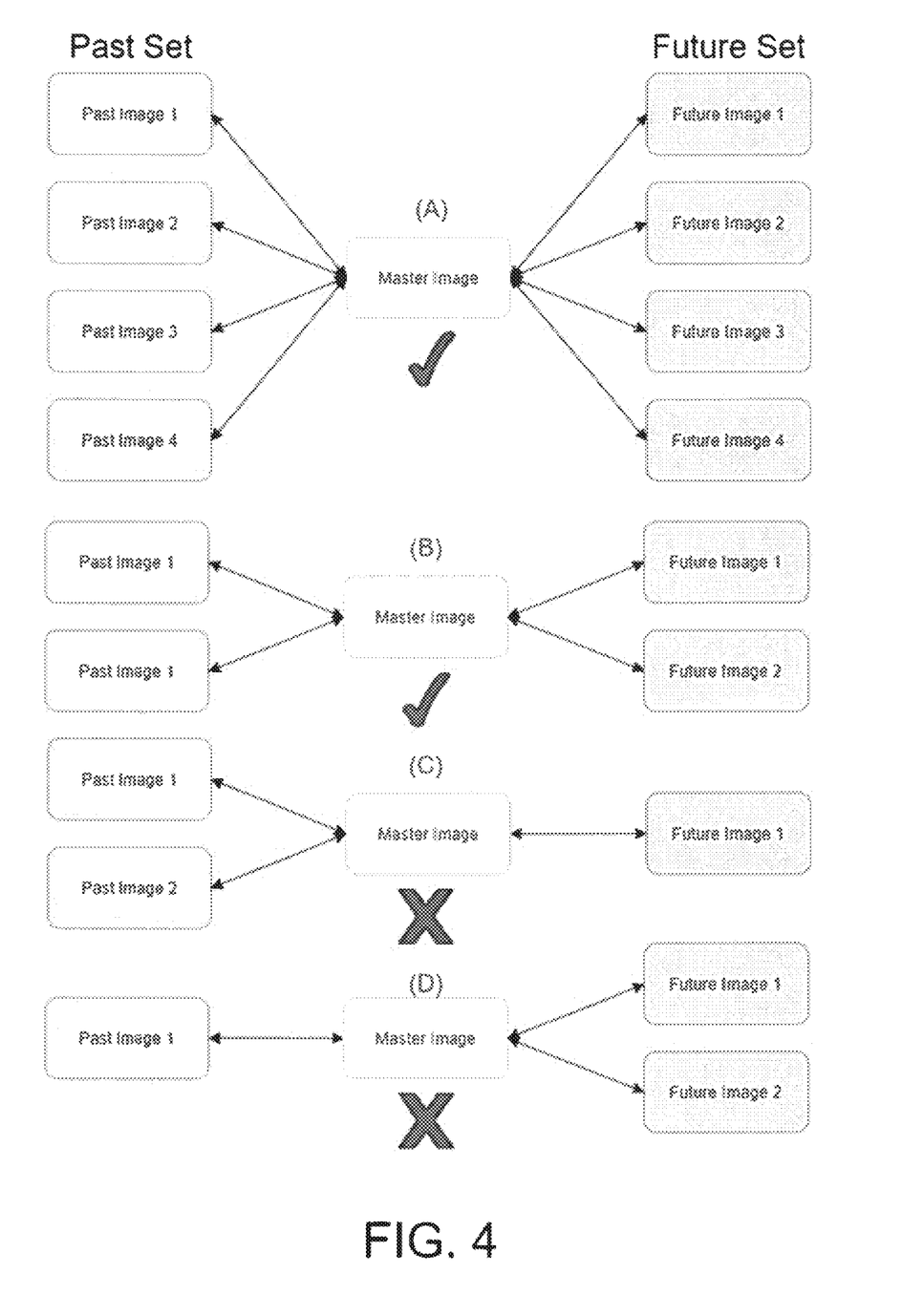
FIG. 4 provides some examples where the minimum image comparison conditions are either satisfied or not satisfied, with both the Minimum Past Image Comparisons and Minimum Future Image Comparisons parameters set to 2 images.

Before proceeding to the next stage in the process, the past set and future set may be checked to see if they contain a specified minimum number of image comparisons, as specified by the Minimum Past Image Comparisons parameter and Minimum Future Image Comparisons parameter (step 230). This check is designed to mitigate false alerts being generated due to spurious correlation values caused by image quality issues or other ephemeral image phenomena not screened by the image filtering module 122. In an embodiment, this may be set to a minimum of two image comparisons in both the past set and future set. Thus, a minimum of two images must be included in both the past set and future set in order to proceed with the change detection process; however, other minimum values are possible, and the minimums for past set and future set could also differ from one another. If the minimum image condition is not met in either the past set, future set, or both, the change detection process for the current master image halts here. FIG. 4 provides some examples where the minimum image comparison conditions are either satisfied or not satisfied, with both the Minimum Past Image Comparisons and Minimum Future Image Comparisons parameters set to 2 images. In the figure, scenario A has 4 images in both the past set and future set, which meets the minimum requirement of at least 2 images in both image sets; thus the process can proceed. Likewise, in scenario B, 2 images are in both image sets, meeting the minimum requirement. In scenario C, while the past image set has 2 images, the future set only has one; this fails to satisfy the Minimum Future Image Comparisons parameter, thus halting the process. In scenario D, while the future set satisfies the minimum requirement, the past set, which has only one image, fails to satisfy the Minimum Past Image Comparisons parameter, again halting the change detection process.

If the Minimum Past Image Comparisons and Minimum Future Image Comparisons conditions are both satisfied, the change detection process is initiated for the current master image. First, the maximum correlation value is found from the past correlation set and future correlation set, which are then stored as "MaxCorr$_{past}$" and "MaxCorr$_{future}$", respectively (step 240). This maximum value can be obtained in several different ways. In a particular embodiment, the overall maximum correlation from each correlation set is obtained, i.e. the overall maximum of the blue, green, red, near-infrared, and NDVI correlations. Other methods are possible; for instance, the individual band correlations for each image in each correlation set could be averaged first, with the maximum average correlation then being stored.

With MaxCorr$_{past}$ and MaxCorr$_{future}$ determined, the next step is to calculate the correlation differential, hereafter referred to as "CorrDiff" (step 250). This is calculated as shown in Equation 2:

$$\text{CorrDiff} = \text{MaxCorr}_{future} - \text{MaxCorr}_{past} \quad (2)$$

Figure 5:
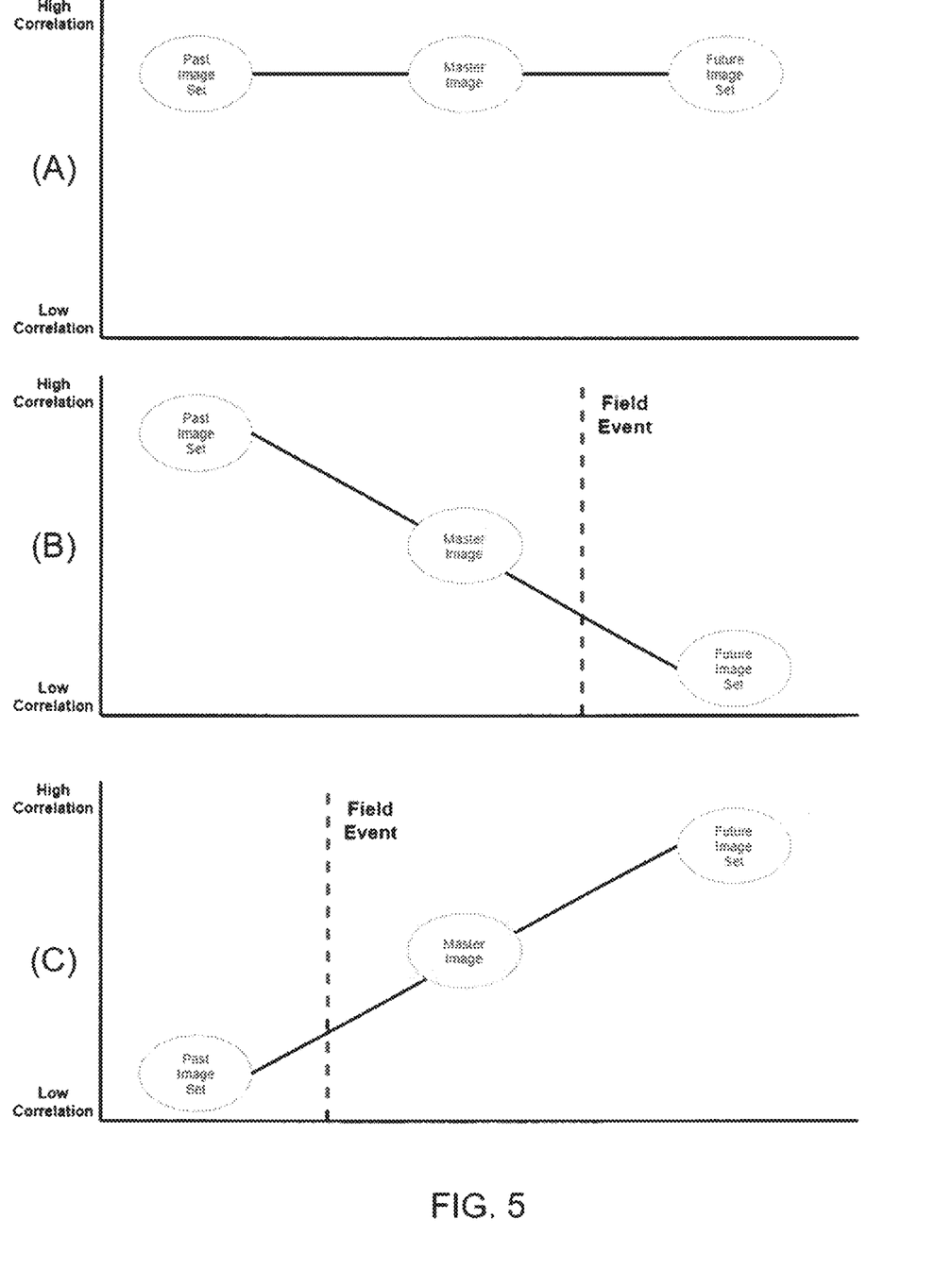
FIG. 5 visually illustrates various scenarios including (A), where the master image has high correlation with both the past and future set of images, the correlation differential is low, (B) when a field event occurs after the master image and the master image has high correlation with the past set and low correlation with the future set, resulting in a large negative correlation differential, and (C) where a field event occurs prior to the master image and the master image has low correlation with the past set, and high correlation with the future set, resulting in a large positive correlation differential.

The correlation differential value is the difference in correlation between the MaxCorr$_{past}$ and MaxCorr$_{future}$ values. Large positive or negative CorrDiff values may indicate field changes. The underpinning theory for this is as follows: ordinarily, agricultural fields change at a relatively slow cadence. Thus, assuming a relatively high frequency of available images, each image should have high correlation with temporally-close images in both the past and future. Thus, both MaxCorr$_{past}$ and MaxCorr$_{future}$ should have high values, and therefore CorrDiff should have a very small positive or negative value (or be equal to 0 if MaxCorr$_{past}$ and MaxCorr$_{future}$ are exactly equal). However, in the case of a sudden change occurring in the field, the following becomes likely: if a field change occurs temporally after the current master image, then the master image should demonstrate high correlation with images in the past set, and low correlation with images in the future set. Thus, the CorrDiff value for the master image should be a high magnitude negative value, since MaxCorr$_{past}$ is notably larger than MaxCorr$_{future}$. On the other hand, if a field change occurred temporally previous to the current master image, then the master image should demonstrate low correlation with images in the past set, and high correlation with images in the future set. This scenario will lead to a high magnitude positive value, since MaxCorr$_{past}$ is smaller than MaxCorr$_{future}$. FIG. 5 visually illustrates the described scenarios. In the first scenario (A), where the master image has high correlation with both the past and future set of images, the correlation differential is low (flat slope on the line between past set and future set). When a field event occurs after the master image (B), the master image has high correlation with the past set and low correlation with the future set, resulting in a large negative correlation differential (downward slope on the line between past set and future set). In the last scenario, where a field event occurs prior to the master image (C), the master image has low correlation with the past set, and high correlation with the future set, resulting in a large positive correlation differential (upward slope on the line between past set and future set).

With the correlation differential computed, the next step in the process is to apply thresholds to the CorrDiff value (step 260). Multiple embodiments for this thresholding are possible. For instance, a single threshold value may be utilized for both positive and negative CorrDiff values. An example of this would be using a value of 0.2 for positive CorrDiff values, and −0.2 for negative CorrDiff values. Another possibility includes using different thresholds for negative and positive CorrDiff values; for example, a value of −0.1 could be used for negative CorrDiff values, while a value of 0.2 was used for positive CorrDiff values. It is also possible to use multiple thresholds, which could be used to estimate the significance level of the detected field change. For example, negative and positive threshold values of −0.1 and 0.1 respectively could be utilized to indicate slight field change. The next threshold levels of −0.2 and 0.2 would indicate moderate field change. A final threshold level of −0.3 and 0.3 could be used to indicate significant field change.

With the threshold(s) applied, if the CorrDiff value for the master image does not exceed any thresholds, the process completes without generating any change alert. From here, the process can be repeated with the next image in the sequence as the master image, assuming more images are available. If no more images are currently available (for instance, if running in "real time"), then the process can be continued at a later time when more images become available. On the other hand, if the CorrDiff value exceeds one or more of the specified thresholds, then a change alert may be issued to a grower and any other desired parties (step 270). The change alert may be issued as a notification which is transmitted to a client system 130 over a network 140. The notification could include any pertinent information, including the estimated significance level of the field change (if multiple thresholds were applied), and the estimated timing of the field change, i.e. if the change occurred before or after the current master image, as conveyed by the CorrDiff value being either negative or positive. Field imagery visualizations could also be transmitted to the grower or other parties to view either directly within the alert, or through directing the user to an application for viewing the image data. Images selected to display the change could include the master image, as well as the images in the past set and future set from which the $MaxCorr_{past}$ and $MaxCorr_{future}$ values were derived.

While the described change detection method makes no attempt to indicate where in the field change has occurred, it is possible to extend this method to highlight specific areas of significant change within an agricultural field. For example, it is possible to use the described method to select image pairs to be compared using a direct image comparison change detection module. In an embodiment, if an alert was generated from a negative CorrDiff value, the master image could be selected along with the past image from which $MaxCorr_{past}$ was derived, and areas of significant field change could be highlighted using the direct image comparison change detection module. For an alert resulting from a positive CorrDiff value, the future image from which $MaxCorr_{future}$ was derived could be selected along with the master image to feed into the image comparison change detection module to highlight areas of significant field change.

Example Computer System

Figure 6:
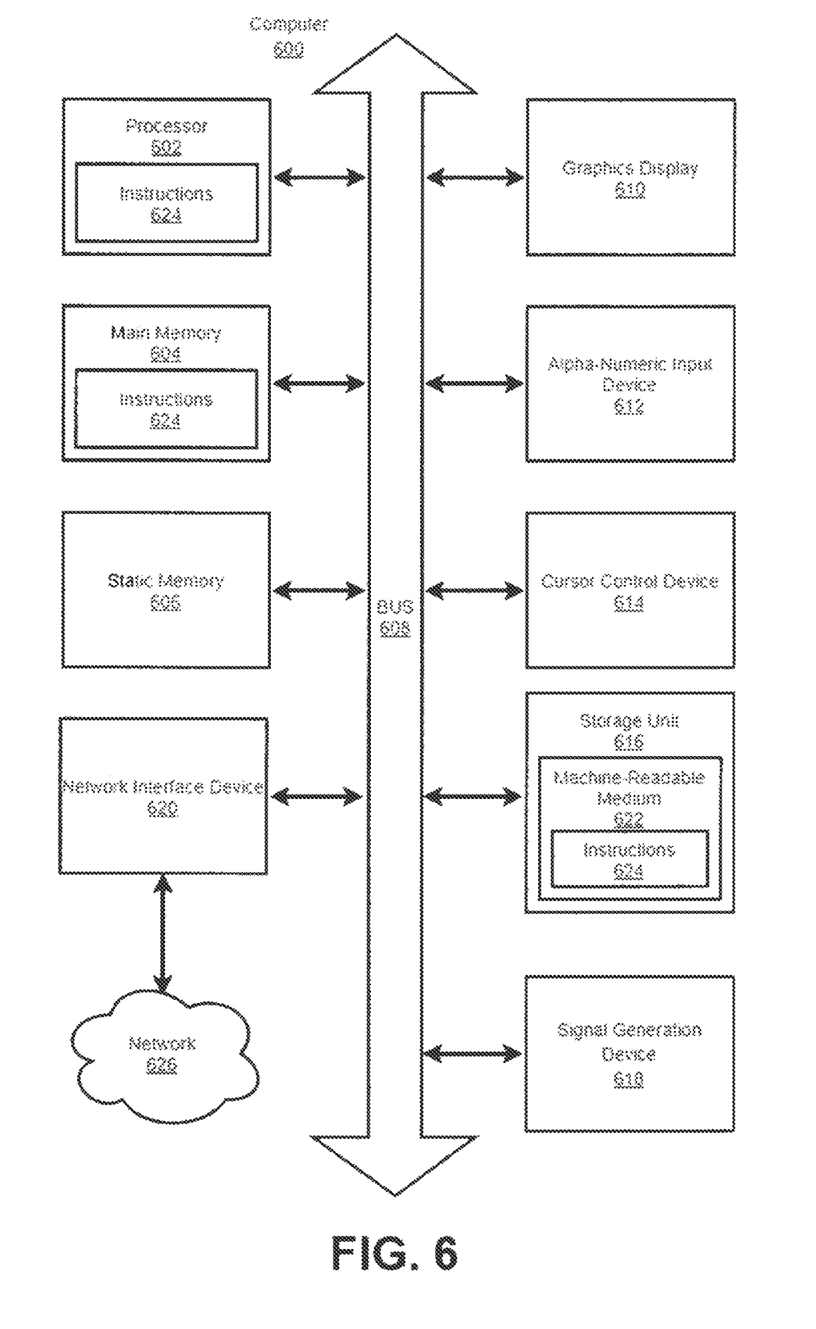
FIG. 6 is a block diagram illustrating components of an example machine for reading and executing instructions from a machine-readable medium, according to one example embodiment.

FIG. 6 is a block diagram illustrating components of an example machine for reading and executing instructions from a machine-readable medium. Specifically, FIG. 6 shows a diagrammatic representation of network system 120 and client device 130 in the example form of a computer system 600. Thus, the computer system implements the method 200 of FIG. 2. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein. The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the client device 130 or network system 120 described in FIG. 1. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 120) via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of detecting a change within an agricultural field during a growing season, the method comprising:
   (a) receiving a plurality of remotely sensed images of the agricultural field acquired during the growing season;
   (b) for each one of a plurality of the remotely sensed images, using a processor,
      (i) designating a currently selected one of the remotely sensed images as a master image;
      (ii) identifying a set of past images among the remotely sensed images that were acquired before the master image;

(iii) computing a past correlation coefficient between each past image and the master image;
(iv) identifying a maximum past correlation value among the past correlation coefficients;
(v) identifying a set of future images among the remotely sensed images that were acquired after the master image;
(vi) computing a future correlation coefficient between each future image and the master image;
(vii) identifying a maximum future correlation value among the future correlation coefficients; and
(viii) computing a correlation differential value corresponding to a difference between the maximum past correlation value and the maximum future correlation value; and
(c) comparing each correlation differential value to a notification criterium and determining a notification condition if one of the correlation differential values meets the notification criterium.

2. The method according to claim 1 including only identifying the maximum past correlation value for the master images that have a number of past images that exceeds a prescribed lower limit associated with the maximum past correlation value, and only identifying the maximum future correlation value for the master images that have a number of future images that exceed a prescribed lower limit associated with the maximum future correlation value.

3. The method according to claim 1 including identifying only remotely sensed images acquired within a prescribed range of time preceding acquisition of the master image as the past images within the set of past images.

4. The method according to claim 1 including identifying only remotely sensed images acquired within a prescribed range of time following acquisition of the master image as the future images within the set of future images.

5. The method according to claim 1 including computing each past correlation coefficient and each future correlation coefficient as a measure of linear correlation between pixel values for spatially co-registered pixels between the images.

6. The method according to claim 1 wherein computing the past correlation coefficient and the future correlation coefficient for each master image includes calculating a correlation value between pixel values for each one of a plurality of matching spectral bands of the images.

7. The method according to claim 1 wherein computing the past correlation coefficient and the future correlation coefficient for each master image includes calculating a correlation value between pixel values for near-infrared bands of the images.

8. The method according to claim 1 wherein computing the past correlation coefficient and the future correlation coefficient for each master image includes calculating a correlation value between vegetation indexes of the images.

9. The method according to claim 1 including identifying the maximum past correlation value as a largest absolute value among the past correlation coefficients and identifying the maximum future correlation value as a largest absolute value among the future correlation coefficients.

10. The method according to claim 1 further comprising:
(i) for each past image computing the past correlation coefficient as an average correlation value of a plurality of different correlation values representing correlations between different matchings spectral bands between the images and identifying the maximum past correlation value as a largest absolute value among the average correlation values; and
(ii) for each future image computing the future correlation coefficient as an average correlation value of a plurality of different correlation values representing correlations between different matchings spectral bands between the images and identifying the maximum future correlation value as a largest absolute value among the average correlation values.

11. The method according to claim 1 including comparing any positive correlation differential values to a prescribed positive notification criterium and comparing any negative correlation differential values to a prescribed negative notification criterium.

12. The method according to claim 1 including comparing each correlation differential value to a plurality of different notification criteria having different notification conditions associated therewith and determining the notification condition based upon which notification criterium has been met.

13. The method according to claim 1 including generating a notification arranged to be transmitted over a network to a computing device configured to receive the notification in response to determination of the notification condition, the notification including the master image associated with the correlation differential value that met the notification criterium.

14. The method according to claim 1 further comprising:
determining a range of image acquisition dates when a field change has occurred by (i) identifying an acquisition date of the master image associated with the correlation differential value that met the notification criterium, (ii) identifying if the field change occurred before or after the acquisition date of the master image based on the correlation differential value being positive or negative, (iii) determining a prescribed range of dates of the set of past images or the set of future images depending upon identification of the field change occurring before or after the acquisition date; and
generating a notification arranged to be transmitted over a network to a computing device configured to receive the notification in response to determination of the notification condition, the notification including the range of image acquisition dates when the field change has occurred.

15. A system for detecting a change within an agricultural field during a growing season, the system comprising:
a memory storing programming instructions thereon;
at least one processor operably coupled to the memory so as to execute the programming instructions whereby said at least one processor is configured to:
(a) receive a plurality of remotely sensed images of the agricultural field acquired during the growing season;
(b) for each one of a plurality of the remotely sensed images:
(i) identify a currently selected one of the remotely sensed images as a master image;
(ii) identify a set of past images among the remotely sensed images that were acquired before the master image;
(iii) compute a past correlation coefficient between each past image and the master image;
(iv) identify a maximum past correlation value among the past correlation coefficients;
(v) identify a set of future images among the remotely sensed images that were acquired after the master image;

(vi) compute a future correlation coefficient between each future image and the master image;
(vii) identify a maximum future correlation value among the future correlation coefficients; and
(viii) compute a correlation differential value corresponding to a difference between the maximum past correlation value and the maximum future correlation value; and (c) compare each correlation differential value to a notification criterium and determine a notification condition if one of the correlation differential values meets the notification criterium.

\* \* \* \* \*